(12) United States Patent
Tang

(10) Patent No.: US 6,955,431 B1
(45) Date of Patent: Oct. 18, 2005

(54) LENS HOLDING STRUCTURE FOR BRACKETS OF FRAMELESS SPECTACLES

(75) Inventor: Shao-Chang Tang, Taipei (TW)

(73) Assignee: Optiunion Co., Ltd., Taipei (TW)

( * ) Notice: Subject to any disclaimer, the term of this patent is extended or adjusted under 35 U.S.C. 154(b) by 0 days.

(21) Appl. No.: 10/959,156

(22) Filed: Oct. 7, 2004

(51) Int. Cl.[7] ............................. G02C 1/02; G02C 5/00
(52) U.S. Cl. ................... 351/110; 351/140; 351/147; 351/152
(58) Field of Search ........................ 351/110, 140–142, 351/145–149, 152

(56) References Cited

U.S. PATENT DOCUMENTS 5,936,702 A * 8/1999 Cheong .................. 351/141
6,296,357 B1 * 10/2001 Bof ....................... 351/140

FOREIGN PATENT DOCUMENTS

DE          3239699 A1 *  5/1984  ............... 351/110

\* cited by examiner

Primary Examiner—Huy Mai
(74) Attorney, Agent, or Firm—Troxell Law Office, PLLC

(57) ABSTRACT

A lens holding structure for brackets of frameless spectacles includes a bracket which has a bolt extended therefrom with an axial key way formed thereon and a holder which has a screw hole on one end with an axial jutting key to couple with the key way, and an arm on another end thereof. The lens is held on the ends by one end of the bracket and one side of the arm. The bracket and the arm have respectively a clamping section. One or all of the clamping sections has a coarse means. Thus the holder may be moved by turning a nut coupled on the bolt to clamp the lens steadily between the bracket and the holder without drilling coupling holes on the lens.

6 Claims, 3 Drawing Sheets

LENS HOLDING STRUCTURE FOR BRACKETS OF FRAMELESS SPECTACLES

BACKGROUND OF THE INVENTION

1. Field of the Invention

The invention relates to a lens holding structure for brackets of frameless spectacles and particularly to a holding structure capable of holding lenses on the brackets of frameless spectacles without drilling holes on the lens.

2. Description of the Prior Art

The present spectacles or eyeglasses generally have two types: with a frame and without a frame. The framed spectacles hold lenses on the frame. The lenses may be held more steadily, but the entire frame is heavier. And the contour of the lenses have to match the size and shape of the frame. Fabrication is more tedious. On the contrary, the bracket and lenses of the frameless spectacles are independent to each other, and the shape may be formed as desired without restriction. They may be coupled easily. Because the frame is omitted, the bracket is lighter, and the contour of the lenses do not need grinding to match the shape of the frame.

Refer to FIG. 1 for a conventional method for coupling the lens of frameless spectacles. The lens 1 has a hole 11 and a cavity 12 on two ends (including one end coupling with the bracket and another end abutting the bridge). The hole 11 is to couple with a bolt 21 and the cavity is to couple with a strut 22 so that the lens 1 may be anchored by at least two spots to prevent the lens 1 from moving on the bracket 2. The bolt 21 has a distal end coupled with a nut 23 and a washer 24 to compress the surface of the lens 1 and couple the lens 1 on the bracket 2.

While the lens holding structure for the brackets of the frameless spectacles mentioned above can hold the lens steadily, the lens 1 has to form the hole 11 and the cavity 12. It is a destructive structure and weakens the strength of the lens. Moreover, as the lens is very hard and the surface is very smooth, to drill the hole and form the cavity is difficult. A slight negligence during the fabrication process could break the lens or produce a defective hole. Product defects are prone to occur and production cost is higher.

SUMMARY OF THE INVENTION

In view of the aforesaid disadvantages occurred to the conventional frameless spectacles such as destructive effect on the lens due to drilling the hole and increasing product defects due to fabrication difficulty, the present invention aims to provide an improved lens holding structure for brackets of frameless spectacles that does not need to form holes or cavities on the lens, thus does not have negative impact to the strength of the lens. As there is no fabrication process to drill the hole, product defects caused by improper fabrication process is eliminated. Hence the problems of lens holding occurred to the conventional frameless spectacles can be solved.

In order to achieve the foregoing object, the lens holding structure according to the invention has a protrusive bolt located on the bracket or the bridge where the lens is to be held. The bolt is formed substantially like the one used in the conventional frameless spectacles. A holder is provided which has an extended arm to couple one side of the lens and an integrated seat with a screw hole formed thereon. The screw hole has a jutting axial key to wedge in an axial key way formed on the bolt to enable the holder to move linearly in the axial direction of the bolt to hold the lens steadily. The bracket or bridge has saw teeth traces on the contact area with the lens to grip the smooth surface of the lens without slipping. The arm also has saw teeth traces to enhance the holding effect of the lens.

By means of the aforesaid construction, the saw teeth traces of the bracket provides multiple spots gripping to prevent the lens from moving about a single axis, thus the lens may be held steadily. Moreover, the holder and the holding section of the bracket can couple with the lens in a cooperative manner to hold the lens steadily without the need of drilling holes. Hence the lens is less likely to fracture, and product defects caused by drilling the lens to form the holes may be reduced.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
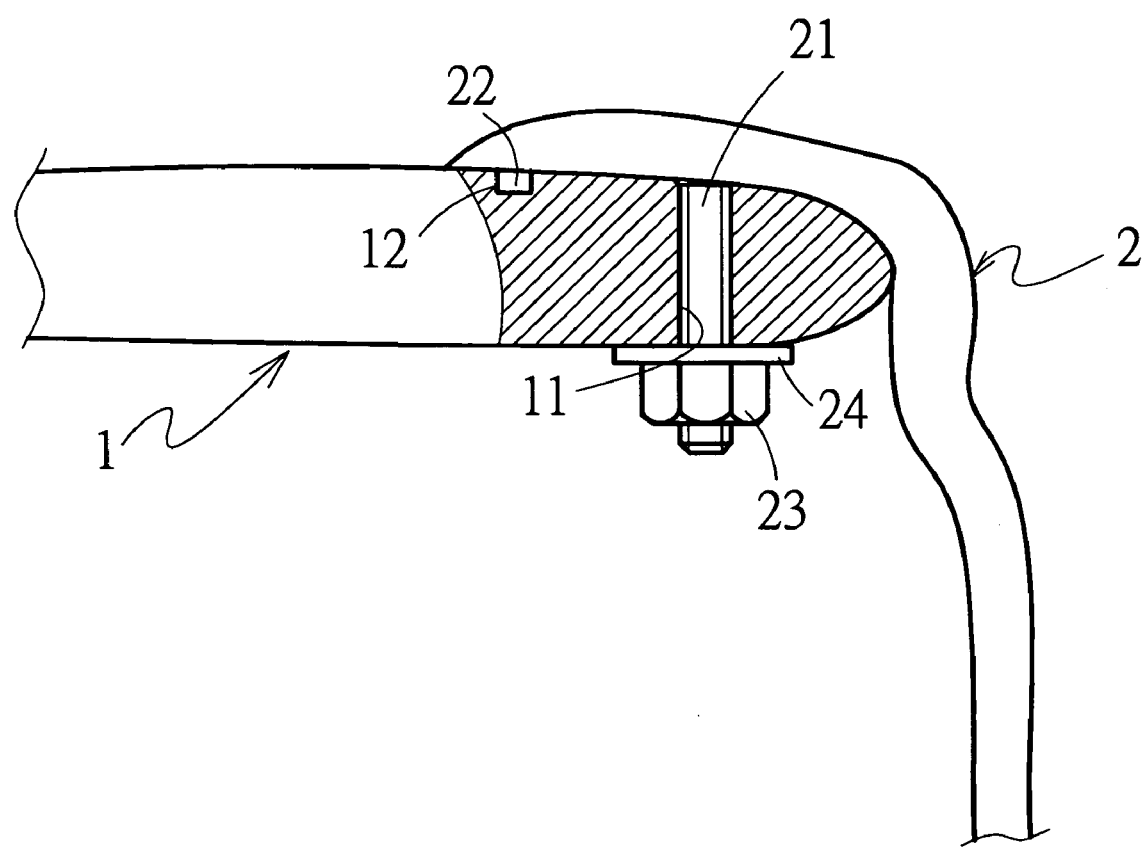
FIG. 1 is a top view of a conventional spectacle bracket for holding a lens.
Figure 2:
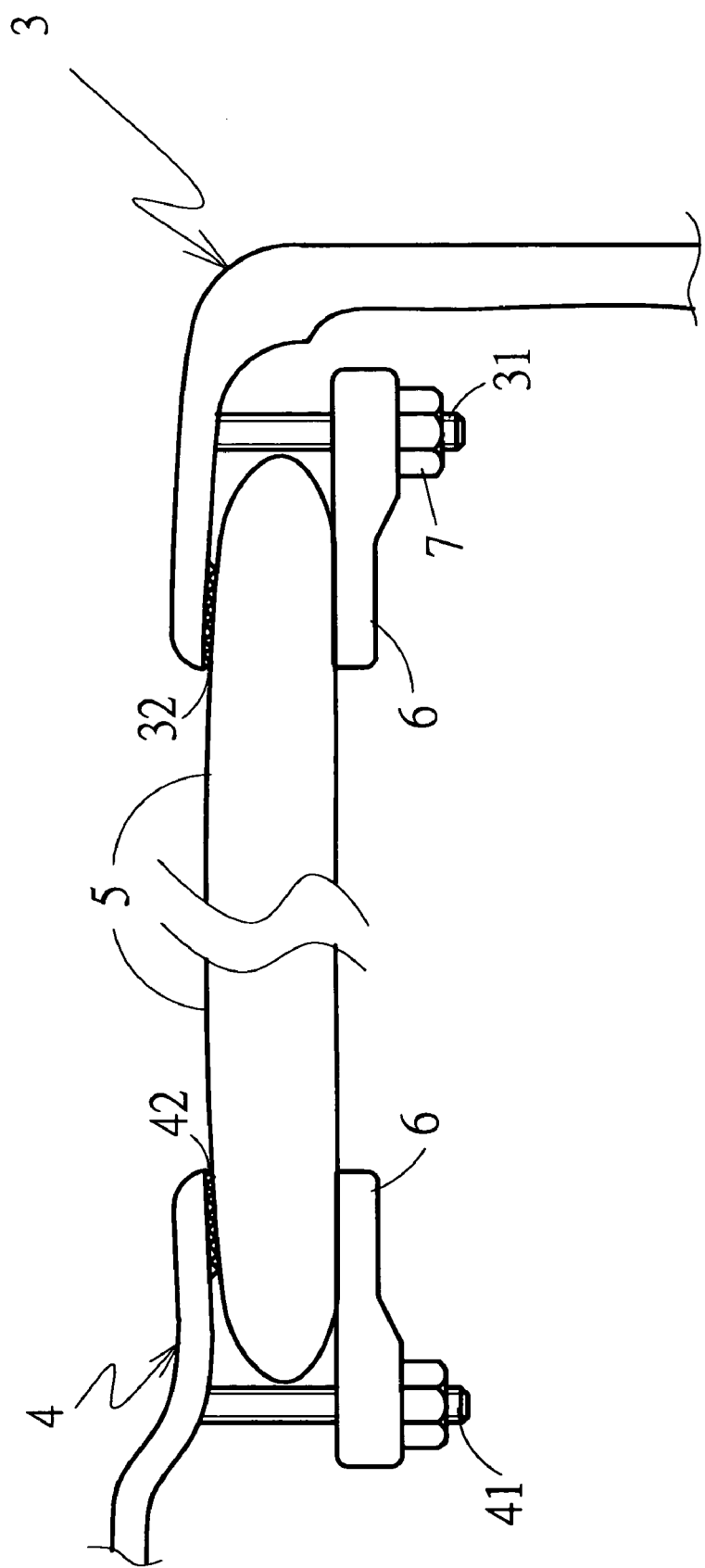
FIG. 2 is a top view of the invention holding a lens.
Figure 3:
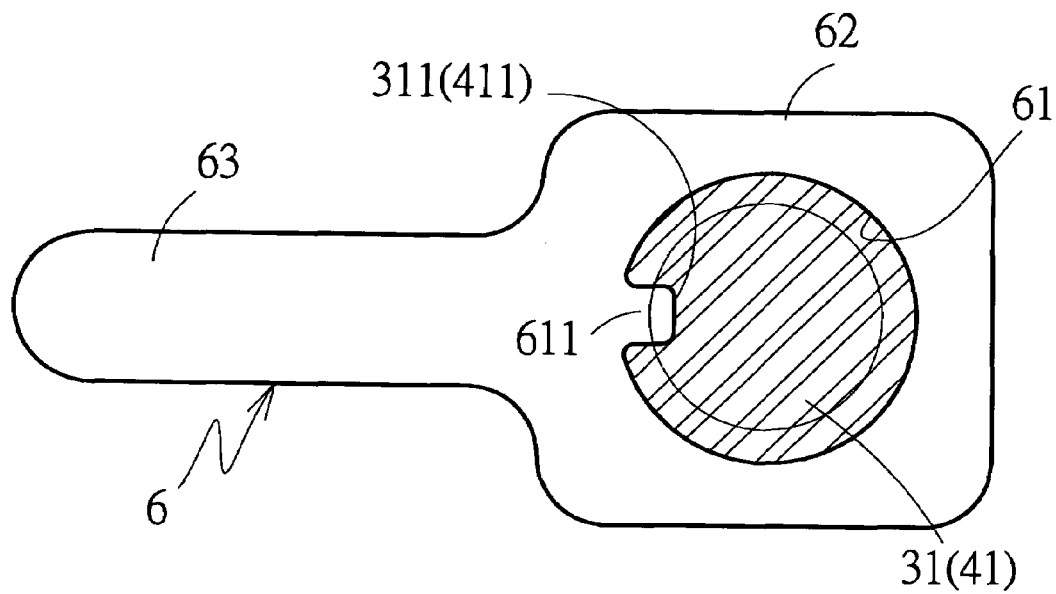
FIG. 3 is a top view of the holder and the bolt of the invention coupled.

Refer to FIG. 2 for an embodiment of the invention. The bracket 3 is for frameless spectacles and is independent from a bridge 4. The bracket 3 and the bridge 4 have respectively a bolt 31 and 41 extended from a location where a lens 5 is to be held. In practice, the bolts 31 and 41 may be extended from inside to outside or from outside to inside. In this embodiment, they are extended in the direction toward the spectacles wearer. A holder 6 is provided which includes a seat 62 with a screw hole 61 in the center and an arm 63 extended from the seat 62 that are formed in an integrated manner as shown in FIG. 3. The holder 6 is fastened to the bracket 3 or the bridge 4 by coupling the bolt 31 or 41 with the screw hole 61. To make the holder 6 to move forwards along a linear track to clamp the lens 5, the bolts 31 and 41 have at least one axial key way 311 and 411 formed respectively on the surface thereof, and the screw hole 61 has at least one axial jutting key 611 to wedge in the key way 311 and 411 so that when a nut 7 coupled on the rear end of the holder 6 is turned, the holder 6 is moved linearly forwards to reach and press the surface of the lens 5. As shown in FIG. 2, there is no washer between the nut 7 and the holder 6. In other embodiments, a washer may be interposed between the nut 7 and the holder 6 to increase the screwing force.

Figure 4:
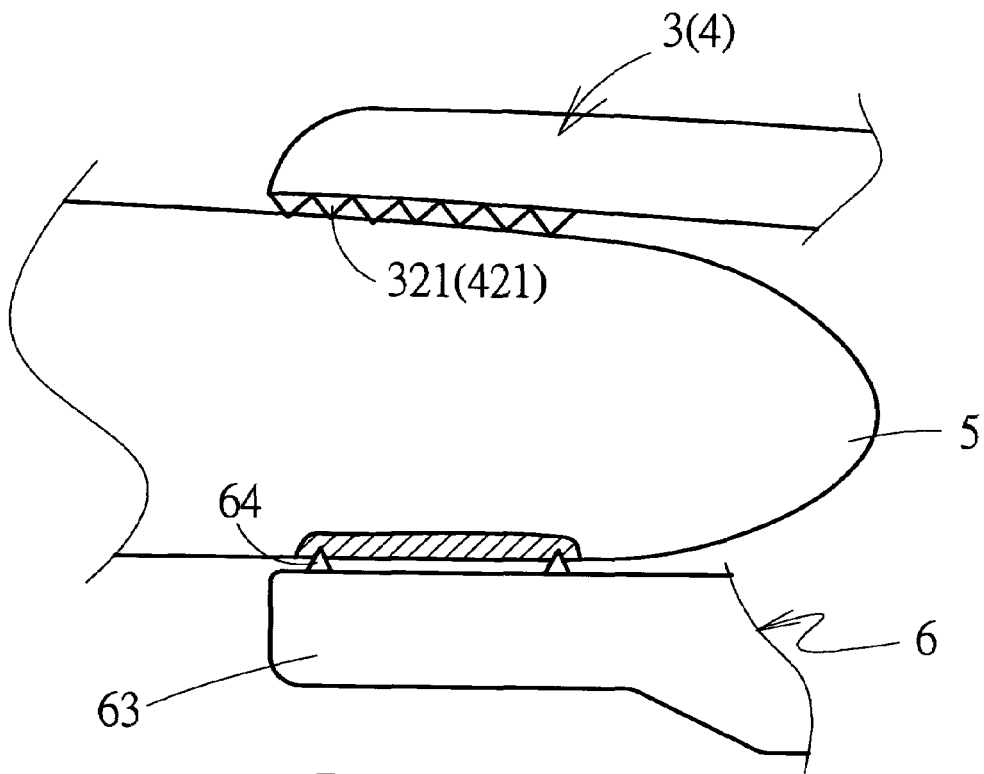
FIG. 4 is a top view of another embodiment of the invention holding a lens.

Refer to FIGS. 2 and 4 for another embodiment of the invention. In order to make the smooth and hard surface of the lens 5 to be held more steadily by clamping sections 32 and 42 of the holder 3 and the bridge 4, the clamping sections 32 and 42 may be formed with a surface of a high friction coefficient such as a coarse or blasted surface, or saw teeth surfaces 321 and 421 as shown in the drawings. The coarse surface may have irregular or regular traces to increase the frictional clamping strength on the lens and provide more contact spots so that coaxial rotation between the bracket 3 and the lens 5 may be prevented and the lens may be held more steadily. Moreover, to ensure that the lens 5 may be held steadily, the contact surface of the clamping section 32 on the arm 63 of the holder 6 with the lens 5 may also be formed with a coarse surface such as the saw teeth 321 and 421, or a plurality of spikes 64 as shown in FIG. 4. The spikes 64 can pierce into the surface of the lens 5 when the holder 6 clamps the lens 5 to increase the holding power. The spikes are not part of the invention. The piercing effect depends of the material of the lens. The lens made from acrylic can form a deeper piercing than the glass lens.

It is to be noted that the bracket 3, bridge 4 and holder 6 with the clamping sections 32 and 42 formed with the saw teeth surface, or the spikes 64 on the bracket 3 that are included in the embodiments set forth above are not the limitation of the invention. They may be formed individually and independently on the bracket, bridge and holder, or formed selectively and alternatively on different brackets for the purpose of providing maximum clamping power. Moreover, to facilitate discussion, the lens bracket for holding the lens is divided into a bracket and a bridge. To those skilled in the art, it is known that the lens bracket includes the bracket and the bridge.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

I claim:

1. A lens holding structure for brackets of frameless spectacles having a bracket to hold a lens, a bolt extended from the bracket abutting the lens, and a nut screwing the bolt to urge the lens to be clamped between the bracket and the nut, comprising:
   a holder located between the nut and the lens surface including a seat and an arm integrally extended from the seat, the seat having a screw hole to engage with the bolt, the screw hole having at least one jutting key, the arm having one side pressing the lens surface;
   wherein the bolt has a least one key way in axial direction to couple with the jutting key during screwing in the screw hole, the bracket having a clamping section which has a coarse means to hold the lens.

2. The lens holding structure of claim 1, wherein the coarse means of the clamping section is saw teeth.

3. The lens holding structure of claim 1, wherein the arm has one side forming a coarse means to press the lens.

4. The lens holding structure of claim 3, wherein the coarse means is saw teeth.

5. The lens holding structure of claim 3, wherein the coarse means is a plurality of spikes.

6. The lens holding structure of claim 1, wherein the bracket includes a bridge to couple with two lenses.

* * * * *